United States Patent [19]

Adcock

[11] Patent Number: 4,674,626
[45] Date of Patent: Jun. 23, 1987

[54] LEAKPROOF ENDLESS BELT CONVEYOR

[75] Inventor: Jimmy L. Adcock, Hillsborough, N.C.

[73] Assignee: M. L. Eakes Co., Greensboro, N.C.

[21] Appl. No.: 561,772

[22] Filed: Dec. 15, 1983

[51] Int. Cl.⁴ ............................................. B65G 15/60
[52] U.S. Cl. ..................................... 198/811; 198/720; 198/836
[58] Field of Search ............... 198/720, 811, 836, 837, 198/818, 841

[56] References Cited

U.S. PATENT DOCUMENTS

| | | | |
|---|---|---|---|
| 756,600 | 4/1904 | Dodge | 198/836 |
| 1,204,461 | 11/1916 | Law | 198/836 |
| 1,224,188 | 5/1917 | Malm | 198/836 |
| 1,422,002 | 7/1922 | Shaw | 198/836 |
| 1,707,998 | 4/1929 | Shaw | 198/836 |
| 1,837,276 | 12/1931 | Levin | 198/836 |
| 1,874,600 | 8/1932 | Ossing | 198/836 |
| 1,897,904 | 2/1933 | Hurxthal | 198/720 |
| 2,718,296 | 9/1955 | Johnson | 198/836 |
| 3,169,633 | 2/1965 | Baker | 198/836 |
| 3,344,909 | 10/1967 | Hansen et al. | 198/836 |
| 3,498,482 | 3/1970 | Lewis | 198/811 |
| 3,587,832 | 6/1971 | Robinson et al. | 198/811 |
| 3,593,864 | 7/1971 | Moser | 198/811 |
| 3,627,111 | 12/1971 | Hillinger | 198/811 |
| 3,734,271 | 5/1973 | Dolgolenko et al. | 198/811 |
| 3,744,619 | 7/1973 | Dolgolenko et al. | 198/811 |
| 3,752,298 | 8/1973 | Wenger | 198/841 |
| 3,773,166 | 11/1973 | Nowacki | 198/841 |
| 3,941,238 | 3/1976 | Lapeyre | 198/811 |
| 3,944,054 | 3/1976 | Ensinger | 198/841 |
| 4,222,482 | 9/1980 | Kelley | 198/841 |
| 4,316,718 | 2/1982 | Drugge | 198/811 |
| 4,321,996 | 3/1982 | Sancken et al. | 198/836 |

FOREIGN PATENT DOCUMENTS

| | | | |
|---|---|---|---|
| 221199 | 8/1957 | Australia | 198/811 |
| 646209 | 11/1928 | France | 198/818 |
| 542187 | 4/1956 | Italy | 198/818 |
| 129667 | 10/1979 | Japan | 198/811 |
| 8877 | of 1901 | United Kingdom | 198/818 |
| 346909 | 4/1931 | United Kingdom | 198/836 |
| 361811 | 11/1931 | United Kingdom | 198/837 |
| 1209525 | 10/1970 | United Kingdom | 198/837 |
| 1243008 | 8/1971 | United Kingdom | 198/837 |
| 391022 | 11/1973 | U.S.S.R. | 198/811 |

Primary Examiner—Joseph E. Valenza
Attorney, Agent, or Firm—Charles R. Rhodes; Judith E. Garmon

[57] ABSTRACT

The side edges and return end of an endless belt conveyor are sealed to prevent particulate material deposited thereon from leaking off the sides and being lost, or worse, from working its way beneath the belt, onto the slide pan, and into the pulleys and end rollers. The front or discharge end in a preferred embodiment is also provided with an air seal to prevent occurrence of the same problems there. The top of the conveyor is covered with a hood.

14 Claims, 7 Drawing Figures

LEAKPROOF ENDLESS BELT CONVEYOR

BACKGROUND OF THE PRESENT INVENTION

This application relates to endless belt conveyors of the type in which the upper and lower flight of an endless belt extend around and between a front end drive roller and a rear end return roller. Such types of endless belt conveyors are used to convey material from one point of an industrial or manufacturing facility to another, sometimes directly, and sometimes by utilizing a plurality of such conveyors in sequence in which material is deposited onto one end (feed end) of a conveyor and delivered to the other or discharge end from whence it is discharged onto another conveyor which may be running in an opposite direction or in the same direction. Such conveyors may be positioned on the floor and easily accessible, or they may be positioned up near the ceiling of such manufacturing or industrial facilities to provide more operating space therebelow. Sometimes such conveyors are used to carry discrete items of a large size thereon, in which case the features of the present invention are not as relevant. In other cases, however, such conveyors are used to carry particulate material such as tobacco, fibers, grain, sand, and the like thereon. Endless belt conveyors may include a flat belt, they may have side walls with slanted selvage strips therealong to provide a trough for the material, or the bed of the conveyor itself and the belt may be curved to provide more of a trough-like effect. It is in conjunction with all of these types of conveyors, which carry particulate material, that the present invention is concerned.

In such conveyors for carrying particulate material, several problems may occur. First, depending upon the particulate material, considerable amounts thereof may be lost during the conveying in various ways. First of all, material may be lost at the transfer point from one conveyor to another by the material either being spilled off the sides at the transfer point, or becoming airborne as would be the case in very small powdery-like material, such as fibers, or tobacco. Material is also lost at the discharge end of a conveyor where the belt conveyor bends around the drive roller, and the curve that has been built into the conveyor must return to a flat configuration. At this point, it is difficult to constrain the material within the confines of the belt and it is sometimes lost over the edges of the belt as its progresses around the discharge pulleys or rollers. A significant area where particulate material is lost is across the lateral edges of the upper flight of the belt conveyor if there are no side walls thereon. Generally this can be corrected to some extent by providing side walls. Material is also lost that clings to the belt conveyor as it becomes the lower flight returning beneath the upper flight. Often the material that clings to the belt will become deposited either on the floor beneath the conveyor, or on some types of dust pan therebeneath which must be periodically emptied. Finally, material is also lost as the belt moves around the rear or return end of the conveyor. Here, in cases in which there is a dust pan beneath the lower flight, there will be some type of cleat or wiper attached to the conveyor at spaced points to wipe the pan clean and bring it back around the return end of the conveyor to the upper flight. In such cases at the rear end, material is often lost off the edges of the return bight of the conveyor.

A separate problem which occurs, other than lost material, is the damage caused by particulate material which works its way between the flights of the belt conveyor, between the conveyor and its support pans, or between the conveyor and the return rollers. Such material builds up, becomes deposited in the rollers, and eventually will cause damage unless the conveyor is periodically stopped, torn down by a machinist and either cleaned or repaired. This obviously results in expensive down time and maintenance.

SUMMARY OF THE PRESENT INVENTION

The present invention, on the other hand, is directed to a solution for the above problems which is accomplished by providing an effective edge seal for the belt conveyor, not only along the upper flight thereof, but along the lower flight, and around the drive roller and return roller. In addition, the conveyor of the present invention is provided with a cover or hood to prevent loss of material which becomes airborne. By providing the cover, not only can material be maintained within prescribed confines, but since there is an enclosed atmosphere, that atmosphere can be treated by the introduction of moisture or like to provide a humidity control, which may be very important in the processing of some particulate materials such as tobacco and textile fibers.

There are four basic areas of the conveyor with which to be concerned: (1) the side edges of the upper flight of the belt conveyor; (2) the side edges of the lower flight of the belt conveyor; (3) the side edges of the belt conveyor as it moves around the return end of the roller; and (4) the side edges of the belt conveyor as it moves around the discharge end roller. In the broadest sense, seals for these areas may be effected to some extent merely by providing a sealing block that is formed appropriately and positioned on the side walls of the framework of the conveyor at such points as to provide a friction type engagement of the side edges of the belt all the way around its circumference. This is a viable approach within the scope of the present invention; however, there are certain further advantages which may be achieved by utilizing other features of the conveyor which are present.

For example, air slide conveyors have become available more in recent years. Air slide conveyors offer the advantage that the normal friction which occurs between the conveyor belt and its support pan is minimized. As a result, less energy is used in driving the belt, and less wear is realized on the belt with the result that less maintenance is required. By incorporating the seal concept of the present invention in an air slide conveyor, the air which impinges against the underneath side of the belt may be utilized to help form the side and end seals in the following manner. As air impinges on the underneath side of the belt, it lifts the side edges of the belt into engagement with side sealing blocks to effect the side seal discussed hereinabove. The air is then channelled off the sides, collected into a longitudinal channel, and conducted to the discharge end roller where it is allowed to discharge inwardly toward the axial center of the conveyor belt. This discharged air blows the particulate material back toward the center of the belt and prevents escape of the material through the sides thereof. The slight pressure of the side edges of the belt against the side sealing blocks along the longitudinal extent of the upper flight thereby provides sufficient seal to prevent inadvertent discharge of the particulate material off the sides of the belt, and yet does not cause undue wear or drag on the belt. Also, rather than pressing sealing blocks against the lower flight, the lower flight of the belt is allowed to drop by gravity onto the sealing blocks to provide a slight pressure thereagainst, which is sufficient to prevent inadvertent loss of material across the side edges of the belt as is returns underneath the conveyor.

One or more cleats are provided on the endless belt to continuously wipe the dust pan beneath the conveyor, thereby preventing buildup of fine dust thereunder. As the belt then returns over the return roller, a return roll cap includes a sealing block which provides slight pressure against the edge of the belt conveyor to prevent loss of material thereunder.

It is therefore an object of the present invention to provide an improved endless belt conveyor which prevents leakage of particulate matter across the edges thereof.

Another object of the present invention to provide an improved endless belt conveyor of the type described in which the leakage is prevented by sealing the side edges completely around the circumference of the belt conveyor.

Yet another object of the present invention is to provide a leakproof endless belt conveyor which utilizes an existing supply of air on the conveyor to effect the seal along the upper flight side edges and drive roll side edges.

Other objects and a fuller understanding of the invention will become apparent from reading the following detailed description of a preferred embodiment along with the accompanying drawings in which:

DETAILED DESCRIPTION OF A PREFERRED EMBODIMENT

Figure 1:
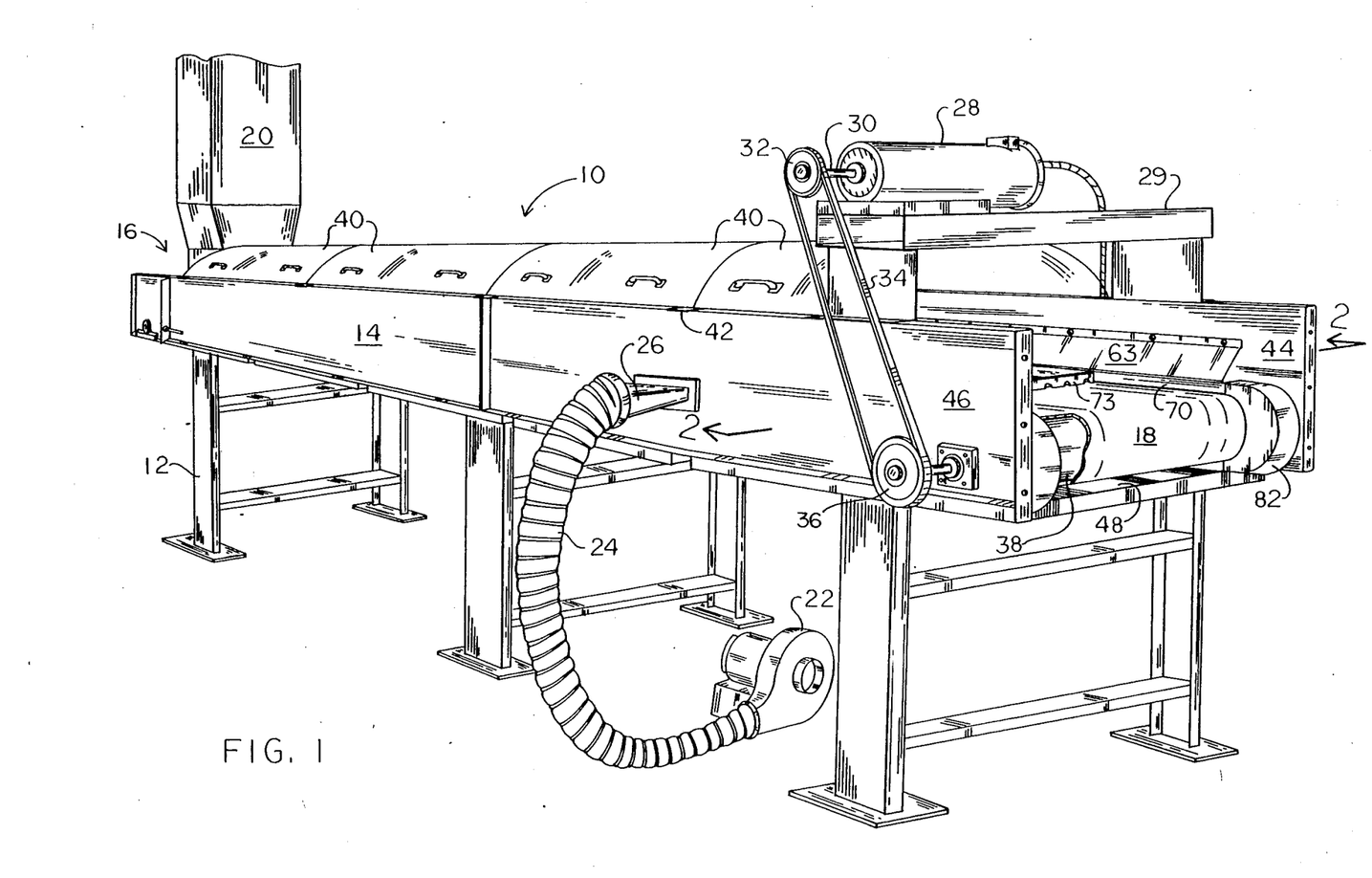
FIG. 1 is a perspective view looking at the discharge end of the endless belt conveyor according to the present invention.

Turning now to FIG. 1, there is best illustrated an overall view of the endless belt conveyor 10 of the present invention which is supported on any type of conventional type of framework 12. The conveyor apparatus 10 includes an endless belt conveyor 14 having a rear or feed end 16 and discharge end 18. Particulate material is fed from a hopper or from the discharge end of a preceding conveyor through a feed chute 20 onto the feed end 16 of conveyor 14. It should be pointed out that in some cases the feed chute 20 may be eliminated and the particulate matter be fed directly from the discharge end of one conveyor (not shown) onto the feed portion of a subsequent conveyor.

A fan 22 is mounted in any convenient location and includes a hose 24 and input nozzle 26 for directing a positive flow of air into the interior of the conveyor apparatus 10 as will be described hereinafter. A drive motor 28 is mounted on a suitable support bracket 29 above the discharge end 18 of the conveyor apparatus for supplying the drive force necessary to turn drive roller 38. In this regard output shaft 30 from drive motor 28 includes an upper pulley 32 attached to the end thereof, and a drive chain 34 connects the upper pulley 32 with the lower pulley 36. In turn, the lower pulley is secured to the end of drive roller 38, whereby operation of the drive motor causes the drive roller to rotate carrying the endless belt 14 in its conveying path. A plurality of cover sections 40 extend across the upper edges of the side walls of the conveyor apparatus and attach to cover brackets 42. The covers are preferably of a transparent plexiglas material, substantially flat, however, are bent into the domed shape illustrated in FIG. 1.

Figure 2:
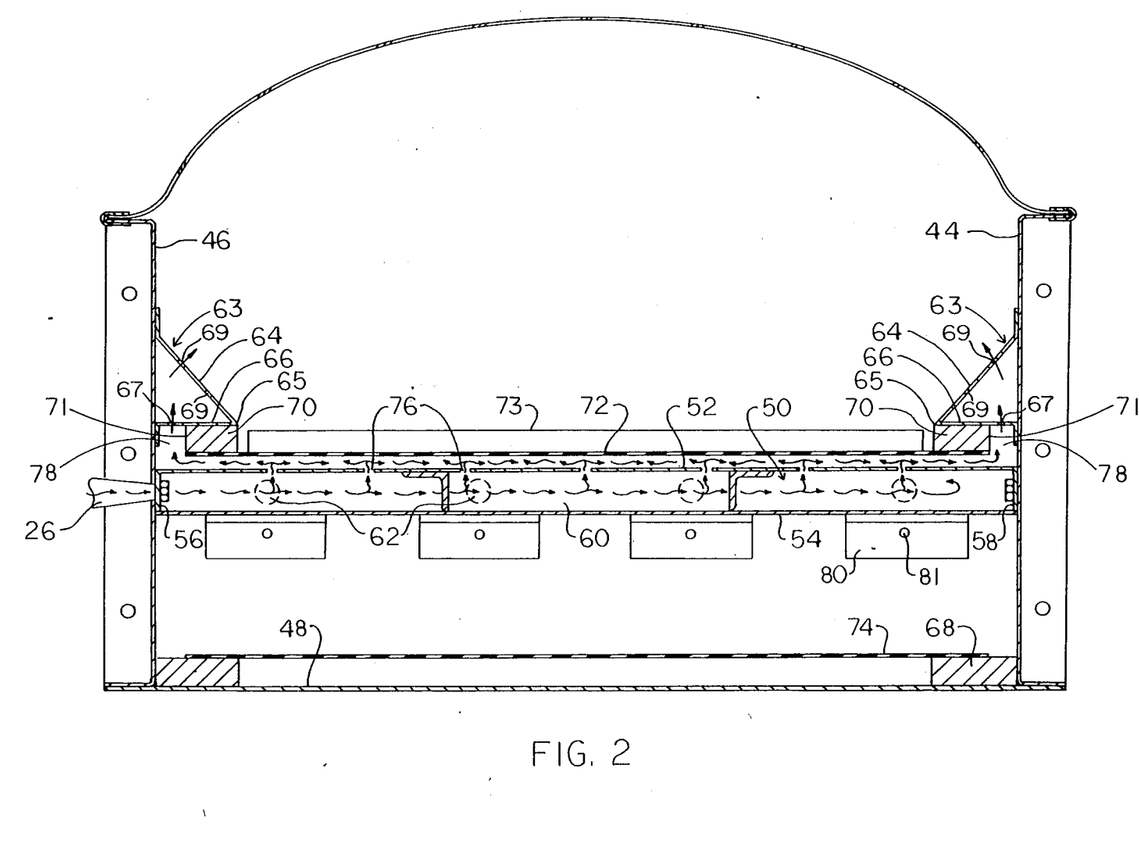
FIG. 2 is a sectional view taken substantially along lines 2—2 in FIG. 1.

Turning now to FIG. 2, there is illustrated a cross-sectional view of the conveyor apparatus 10. A pair of side walls 44,46 extend in sections longitudinally of the length of the conveyor apparatus 10. A dust pan 48 connects the lower edges of side walls 44,46 and catch any particulate material which falls from the lower flight 74 of the endless belt 14. A support pan 50 extends between side walls 44,46 at a point approximately intermediate the height thereof. Support pan 50 includes a perforated upper panel 52, a lower panel 54, side panels 56, 58 and end walls 60. The support pan 50 is formed in a plurality of sections approximately ten feet in length. Further, each section is assembled by means of brackets 80, which are positioned at each end of each pan section. The brackets from one pan thus abut the adjacent brackets from the other pan, and bolts (not shown) extend through openings 81 in the bracket to secure the pans together. Each end wall 60 of the pans 50 include a plurality of openings 62 therein, so that when the pans are assembled, there is a continuous air communications from one end of the conveyor to the other through the pan. The pan construction can be further seen in FIG. 6. Each opening 60 includes a rubber or polymeric grommet 65 (FIG. 6) therearound, so that when two adjacent pans are abutted, the grommets of one pan engage the grommets of another and provide a seal to prevent leakage of air therearound.

A selvage strip 63 extends along the inner surface of side walls 44,46 longitudinally thereof. The selvage strip 63 is triangular shaped and includes an angled member 64 and a horizontal member 66. Angled member 64 is secured to the side wall 44,46 at a point near the upper edge thereof and extends inwardly and downwardly therefrom to a point 65 which is spaced above support pan 50. The horizontal member 66 extends from the termination point 65 of angle member 64 horizontally outwardly toward the side wall and is connected thereto. A sealing block 70 is attached to the undersurface of horizontal member 66, however, terminates at a point 71 spaced from side walls 44,46 for reasons to be hereinafter described.

In the arrangement illustrated in FIG. 2, the upper flight 72 of the endless belt 14 then lies between the sealing block 70 and the upper panel 52 of support pan 50. The lateral edges of upper flight 72 extend to a point approximately one inch from the side walls 44,46. In the normal position with no air introduced through inlet nozzle 26, the upper flight 72 rests on the upper panel 52 of the support pan 50. However, when the fan 22 is activated upon activation of the motor 28, and air is introduced into the interior of support pan 50 through nozzle 26, the air, passing through perforations 76 causes the upper flight 72 to lift into sealing engagement with sealing block 70. Obviously, there must be a side opening in one of the pan sections 50 and through side wall 46 to allow introduction of air thereinto. Otherwise, the remaining support pan sections do not need side openings, because once the air is introduced into one of the support pans, it is communicated with the other support pans through the openings 62.

The air that impinges against and lifts the upper flight 72 of the endless belt, moves outwardly into the longitudinal channel 78 which extends lengthwise of the conveyor apparatus and is formed by the outer edge of sealing block 70, the upper panel 52 of support pan 50, the inner surface of walls 44,46, and the under surface of the horizontal member 66 of selvage strip 63. The purpose of this air conduit will be discussed hereinafter.

The lower sealing blocks 68 extend longitudinally of the conveyor apparatus 10 alongside side walls 44,46, and are attached to and rest on dust pan 48. The lateral edges of lower flight 74 then rest upon sealing blocks 68 as the lower flight returns beneath the conveyor. As the lower flight 74 returns, one or more cleats 73 attached to the surface of the endless belt 14 wipe the pan 48 clean. Obviously, the height of cleat 73 must be at least equal to or greater than the distance between lower flight 74 and dust pan 48 in order to obtain the required wiping action.

Figure 3:
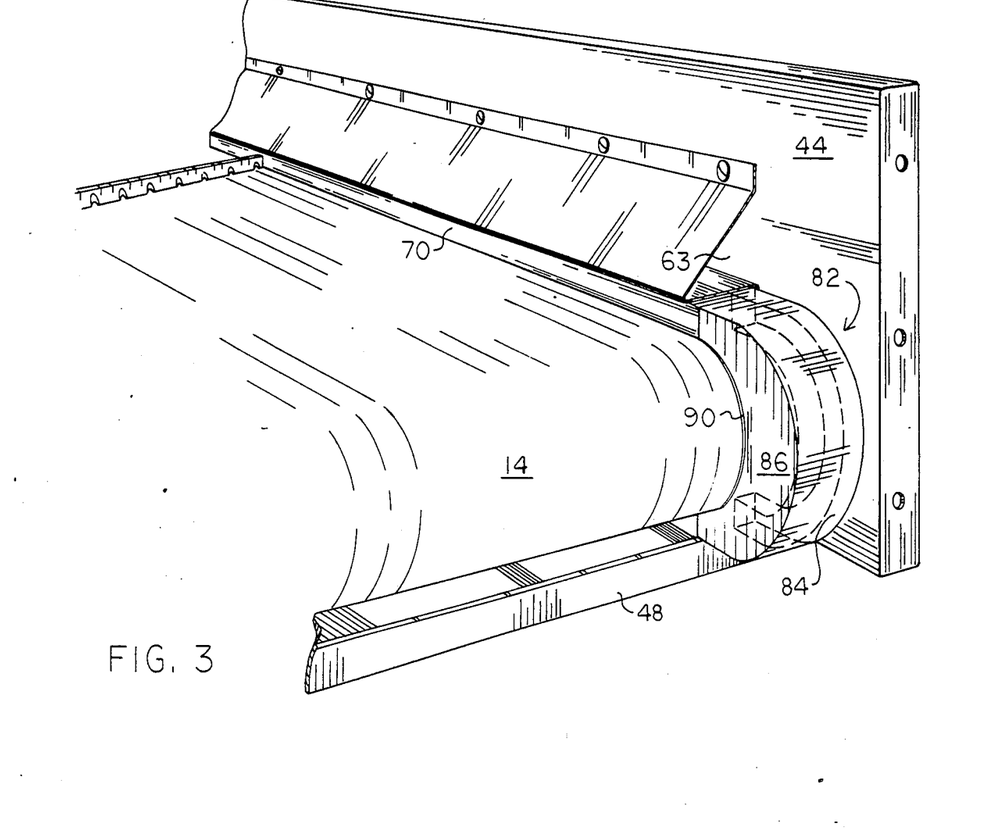
FIG. 3 is an enlarged perspective view, with parts broken away, illustrating a portion of the discharge end of the conveyor.
Figure 3A:
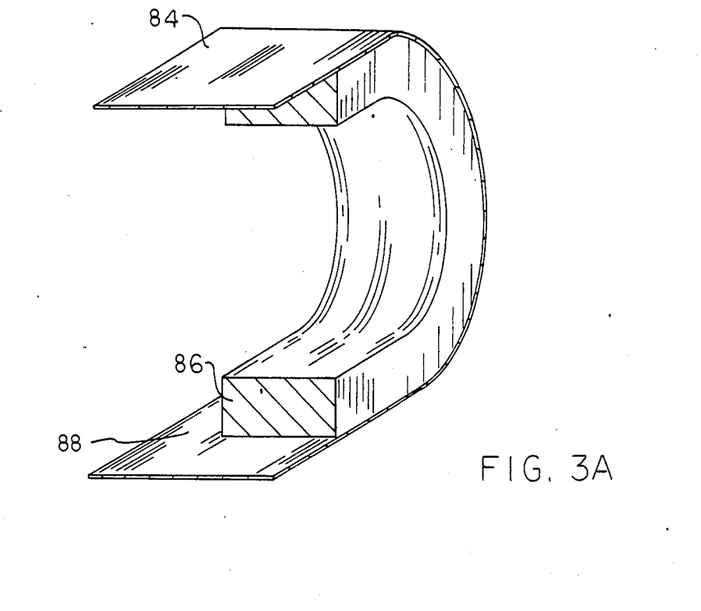
FIG. 3a is a perspective view illustrating the inside of a discharge end cap removed from the conveyor.

The sealing action at the discharge end is best illustrated in FIGS. 3 and 3a. Toward this end, there is provided an end cap 82 which basically extends the seal around the end of the discharge roller to seal the lateral edges of the endless belt 14 as it circumnavigates the end rollers. Cap 82 includes an arcuate shaped metal cover 84 which is attached to the adjacent side wall 44,46 or to the selvage strip 63 in any conventional manner. Inside the metal cover 84 is an arcuate shaped sealing block 86 having the same outer radius of curvature as that of the metal cover 84. Looking at FIG. 3a, it can be seen that block 86 is not as wide as metal cover 84, and therefore there is a channel 88 remaining between the block 86 and side wall 44. The sealing block 86 is also arcuate shaped, so that when assembled, channel 88 is actually an extension of the longitudinal channel 78 illustrated in FIG. 2. Thus, when the air is introduced through nozzle 26 into the support pans 50, as it flows into channel 78, the air will flow down into channel 88. The inner curvature of sealing block 86 is such that there is a slight gap 90 between sealing block 86 and the return bight of the discharge end 18 of the endless belt 14. Thus, there will be a flow of air through the gap 90 which will tend to force any particulate material near the edge of belt 14 back toward the central axis thereof. This air flow thus acts as an air seal to keep particulate material from working its way through the slot 90 at the discharge end of the conveyor.

Figure 4:
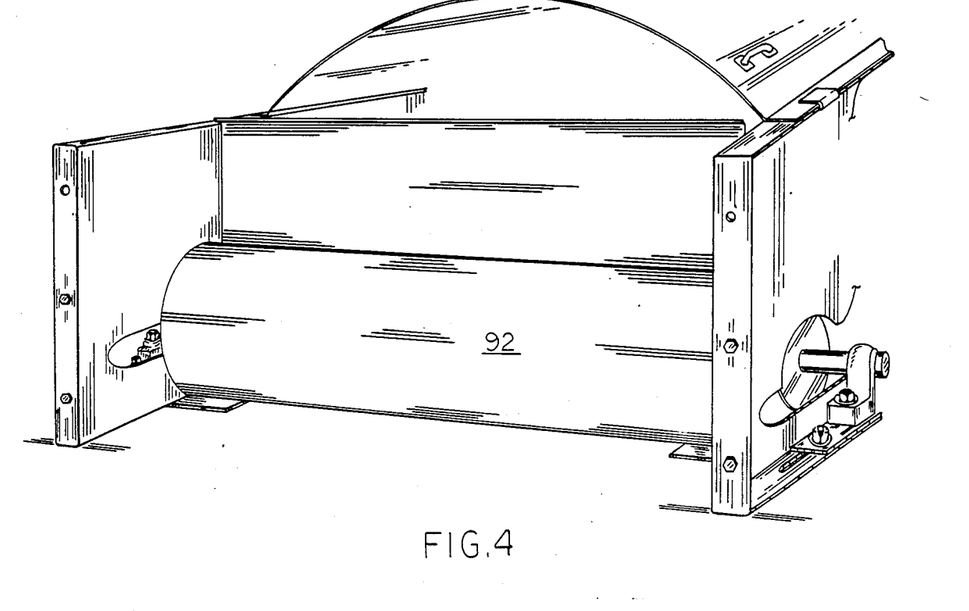
Fig. 4 is a perspective view, with parts broken away, illustrating the rear or feed end of the conveyor according to the present invention.
Figure 5:
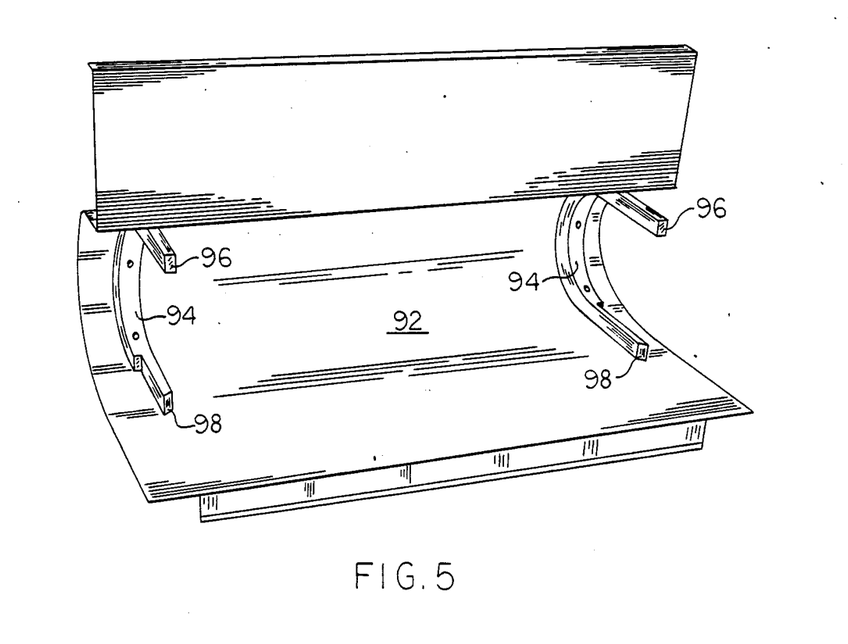
FIG. 5 is a perspective view illustrating the rear end cap removed from the conveyor of the present invention.

Turning now to the rear end 16 of the conveyor apparatus 10, there is illustrated in FIGS. 4 and 5 the sealing means for preventing particulate matter from escaping from the endless belt 14 at that point. In this regard, a shield 92 encircles the endless belt 14 as it moves around the rear end roller. As can be seen in FIG. 5 a generally U-shaped sealing block 94 is attached to the inner surface of shield 92, and when assembled, provides a slight frictional engagement with the lateral edges of belt 14. This effectively forms a seal and maintains the particulate material on the belt 14 as it moves around the rear or feed end of the conveyor apparatus. The sealing block 94 has a pair of legs 96,98 which engage correspondingly shaped portions of sealing block 68 and 70 of the rear end conveyor section. The air from channel 78 which flows rearwardly of the conveyor merely escapes this point at 93 to prevent a buildup of air. While a gravitational type air seal has been shown, it is obvious that an air seal could be provided for the lower flight also by expanding the depth of support pan 50 and providing perforations in the lower panel thereof. Air would then impinge against the lower flight and force it against sealing blocks 68.

Figure 6:
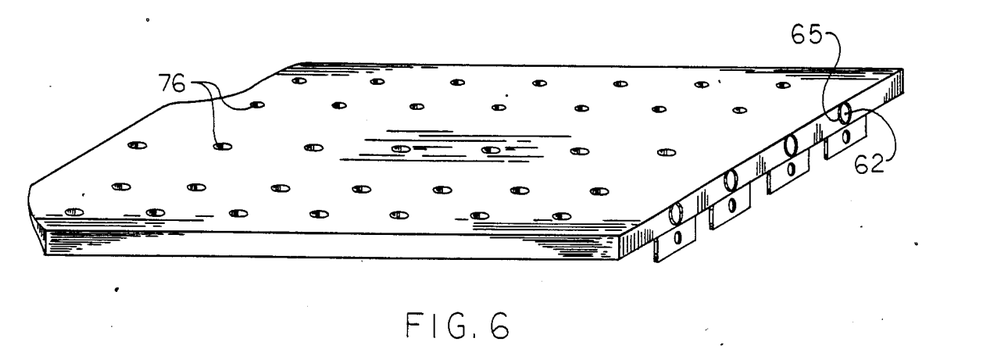
FIG. 6 is a perspective view of one support pan section illustrating the top, end, and one side.

Looking now at FIG. 6, there is illustrated a portion of one of the support pans which better illustrates the perforations 76 in the upper surface thereof and the openings 62 in the end walls with the grommets 65 therearound. It should be pointed out here that should the openings 62 not be sufficient to provided a good flow of air longitudinally of the conveyor, the openings 62 can be replaced with a larger slot or plurality of slots.

Finally, should the particulate material being processed need a controlled atmosphere, such as humidity control, this can be easily accomplished by introducing the air with the proper moisture content through nozzle 26 to the support pans 50. The only difference in the construction of the conveyor 10 would be that when the air is introduced into side channels 78, there are perforations 67,69 in the horizontal member 66 and angular member 64, respectively, of the selvage strip which allows communication for the humidified air to be introduced into the conveying chamber which extends between side walls.

While a preferred embodiment of the invention has been described in detail hereinabove, it is obvious that various changes and modifications might be made without departing from the scope of the invention which is set forth in the accompanying claims.

What is claimed is:

1. An endless belt conveyor for receiving and delivering particulate matter deposited thereon toward a discharge end comprising:
    (a) a pair of spaced side walls extending the length of said conveyor;
    (b) a drive roller journalled in and extending between said side walls at the discharge end of said conveyor and a return roller journalled in and extending between said side walls at the rear end of said conveyor;
    (c) a bottom dust pan connecting the lower edges of said side walls and extending beneath the area defined by said drive roller, said return roller, and said side walls;
    (d) an upper support pan extending between said side walls generally parallel to said bottom dust pan at a level intermediate the top and bottom of said side walls, said upper support pan extending between said drive roller and said return roller and comprising an air chamber formed by top and bottom panels and side and end walls, perforations in said top panel, and means for introducing a flow of air into said chamber which air escapes through said perforations in said top panel;
    (e) an endless belt extending around said drive roller and said return roller, the upper flight of said belt resting on the top panel of said support pan in the absence of said air flow but being lifted to form an air slide conveyor in the presence of air, and the lower flight of said belt being spaced above said dust pan, said belt being narrower in width than the corresponding width of said support pan and dust pan, whereby the opposite side edges of said belt are spaced from said side walls, said belt further including at least one cleat extending transversely of said belt and upstanding therefrom, the height of said cleat above the surface of said belt being at least as great as the space between said lower flight and dust pan whereby the cleat wipes the dust pan clean as the lower flight passes thereby;

(f) a sealing block mounted on each side wall above the side edges of said upper flight and extending the length of said upper flight, the spacing of said sealing block from the top panel of said support pan being greater than the thickness of said endless belt so that upon introduction of said air flow the upper flight of said belt is lifted until the lateral edges thereof engage the underside of each of said sealing blocks to aid in formation of a side seal and prevent passage of air and particulate matter therebetween;

(g) a selvage strip extending longitudinally of and attached to said side walls at a point above said endless belt, said selvage strip comprising an angular member extending downwardly and inwardly from the inner surface of the adjacent side walls to a termination point spaced above the side edges of said upper flight and a horizontal member extending from said termination point to said side wall, said sealing block being attached to the undersurface of said horizontal member, whereby said selvage strip provides an angular side wall to contain particulate material on said endless belt as well as providing a support means for the sealing block, the outer edge of said sealing block being spaced from said side wall, and a longitudinal air channel formed between said side wall, said sealing block being spaced from said side wall, and a longitudinal air channel formed between said side wall, said sealing block, the undersurface of said horizontal member, and the top surface of said support pan for capturing some of the air escaping through the perforations in the top panel of said support pan;

(h) a sealing block between said dust pan and the lateral edges of the lower flight of said endless belt, said sealing block extending the length of said lower flight and being so arranged with respect to said lower flight that the lateral edges of said lower flight rest by gravity upon said sealing strip thereby effectively forming a barrier tending to maintain the particulate material on said dust pan rather than to allow it to escape off the sides thereof;

(i) end caps surrounding the lateral edges of said endless belt as it moves around the discharge end of said conveyor apparatus, each of said end caps including a sealing means for maintaining said particulate material within the width confines of the belt; and (j) said sealing means associated with each of said end caps at the discharge end includes a means for the introduction of a flow of air across the surface of said endless belt from the edges thereof toward the center to urge particulate material on said belt toward the longitudinal center thereof.

2. The endless belt conveyor according to claim 1 and further including an end cover surrounding the return end of said endless belt conveyor, said end cover including sealing means protruding inwardly from the inner surface of said end cover and engaging the lateral surfaces of said endless belt as it moves around said return roll, said end cover providing a barrier tending to prevent the particulate material from dropping off said belt and to maintain the particulate material within the width confines of the belt.

3. The endless belt conveyor according to claim 1 wherein air that is introduced through said perforations in the top panel of said support pan, after impinging against and lifting the upper flight of said endless belt, flows outwardly into said air channels, and wherein end caps surround the lateral edges of said endless belt as it moves around the drive roll, said end caps being provided with an air channel communicating with said longitudinal channel, and gap means between said end cap and said drive roll for providing a flow of air across the surface of said endless belt from the edges thereof toward the center to urge particulate material on said belt toward the longitudinal center thereof.

4. The endless belt conveyor according to claim 3 wherein a cover extends across the conveyor apparatus along a major length thereof from the upper edge of one side wall to the upper edge of the other side wall, said selvage strip being provided with openings therein communicating with a longitudinal channel, whereby trreated air from said air source may be introduced into the chamber formed by said endless belt conveyor, said side walls, and said cover.

5. The endless belt conveyor according to claim 1 wherein said upper support pan is fabricated in a plurality of sections, and means for providing communication from one section to the next to permit the passage of air therebetween.

6. In a conveyor of the type wherein an endless belt includes upper and lower flights extending between a rear or feed end and a front or discharge end and wherein particulate matter is deposited on and carried by the upper flight toward the discharge end, discharged from the belt as the upper belt reaches the discharge end and moves around an end roller, and wherein a dust pan extends the length of sand beneath the lower flight of the belt conveyor, the improvement wherein said particulate matter is prevented from leaking off said dust pan or around the lateral edge of the lower flight and into the area between the upper and lower flights, said improvement comprising:

(a) cleat means carried by said endless belt conveyor for periodically wiping said dust pan clean;

(b) lower sealing means extending along and adjacent each lateral edge of said lower flight of said endless belt conveyor between the side edges thereof and said dust pan for preventing collection of said particulate matter from said dust pan on the top surface of the lower flight of said endless belt which can work its way into the rollers between the flights and for preventing loss of particulate matter through the side space between the lower flight and said dust pan;

(c) said lower sealing means including a sealing block mounted on said dust pan along each side edge thereof, and separating the dust pan from the lateral edges of the lower flight of said endless belt, each of said sealing blocks extending the length of said lower flight, the distance between said sealing blocks being less than the width of said belt conveyor, so that the lateral edges of said lower flight of said belt conveyor rests by gravity upon the upper surface of said sealing blocks thereby effectively forming a chamber between the dust pan, lower flight, and the sealing blocks tending to maintain the particulate material on said dust pan rather than to allow it to escape along the sides thereof;

(d) said cleat means extending outwardly from the surface of said belt a distance at least as great as the space between said lower flight and said dust pan whereby the cleat wipes the dust pan clean as the lower flight passes thereby;

(e) an upper sealing means extending along each lateral edge of said upper flight of said endless belt conveyor for preventing escape of particulate matter off the side of the upper flight of said belt conveyor;

(f) said upper sealing means comprises a sealing block and means for introducing an air flow beneath the upper flight of said endless belt to urge the edges thereof into sealing engagement with said sealing block to prevent passage of particulate matter therebetween;

(g) an air channel extending longitudinally along the lateral edges of said endless belt and receiving air impinging against the underneath side thereof being forced laterally to the edges thereof, a front end sealing means receiving air from said longitudinal air channel and discharging said air across the surface of said endless belt as it passes around said discharge roller, thereby urging particulate matter toward the longitudinal center thereof.

7. The improvements in endless belt conveyors according to claim 6 and further comprising a hood means covering said upper flight and forming an air chamber therebelow for the particulate material being carried by said upper flight; means for introducing treated air into said air chamber.

8. A method for preventing leakage of particulate matter from an endless belt conveyor of the type including upper and lower flights extending between a front end drive roller and a rear end return roller, and a dust pan extending the length of the conveyor beneath the lower flight, said method comprising the steps of:

(a) periodically wiping the dust pan clean of particulate matter and returning the particulate matter therefrom to said upper flight;

(b) sealing the side edges of said upper and lower flights to prevent leakage therefrom;

(c) sealing the side edges of said belt as it moves around said return roller; and (d) inducing a flow of air from the lateral edges of said endless belt inwardly as the endless belt passes around the front end drive roller to prevent the loss of particulate matter across the sides of said endless belt as it passes around the front end roller.

9. The method according to claim 8 further including the steps of introducing air beneath said upper flight to force the edges thereof upwardly into sealing engagement with a stationary sealing block.

10. The method according to claim 9 and further including the steps of controlling the moisture content of the air introduced beneath said upper flight and subsequently introducing said air into the area above said upper flight to control the moisture content of the particulate matter thereon.

11. The improvement according to claim 6 and further including a third sealing means associated with the edges of said endless belt conveyor at the rear end thereof to preventing loss of particulate matter across the sides of the belt conveyor as it passes around the rear end rollers.

12. The improvement according to claim 11 and further including a fourth sealing means at said discharge end of said endless belt conveyor for urging particulate matter toward the center of said belt as it passes around the front end rollers.

13. In a conveyor of the type wherein an endless belt includes upper and lower flights extending between a pair of spaced side walls and a rear or feed end and a front or discharge end, and wherein particulate matter is deposited on and carried by the upper flight toward the discharge end, discharged from the belt as the upper flight reaches the discharge end and moves around an end roller, the improvement wherein said particulate matter is prevented from leaking off the conveyor or into the area between said upper and lower flights, said improvement comprising:

(a) an upper support pan extending between said side walls generally parallel to said upper and lower flights at a level intermediate the top and bottom of said side walls, said upper support pan extending between said rear and front ends and comprising an air chamber formed by top and bottom panels and side and end walls, perforations in said top panel, and means for introducing a flow of air into said chamber which air escapes through said perforations in said top panel;

(b) said endless belt extending around end rollers, the upper flight of said belt resting on the top panel of said support pan in the absence of said air flow and the lower flight of said belt extending beneath said support pan, said belt being narrower in width than the corresponding width dimension of said support pan, whereby the opposite side edges of said belts are spaced inwardly from said side walls;

(c) a sealing block mounted on each side wall above the side edges of said upper flight and extending the length of said upper flight, the spacing of said sealing block from the top panel of said support pan being greater than the thickness of said endless belt, so that upon introduction of said air flow the upper flight of said belt is lifted until the lateral edges thereof engage the underside of said block to prevent passage of particulate matter therebetween;

(d) a selvage strip extending longitudinally of and attached to said side walls at a point above said endless belt, said selvage strip comprising an angular member extending downwardly and inwardly from the inner surface of the adjacent side walls to a termination point spaced above the side edges of said upper flight and a horizontal member extending from said termination point to said side wall, said sealing block being attached to the undersurface of said horizontal member, whereby said selvage strip provides an angular side wall to contain particulate material on said endless belt as well as providing a support means for said sealing block;

(e) the outer edge of said sealing block being spaced from said side wall, and a longitudinal air channel formed between said side wall, said sealing block, the undersurface of said horizontal member, and the top surface of said support pan for capturing some of the air escaping through the perforations in the top panel of said support pan; and (f) a cover extending across the conveyor apparatus along a major length thereof from the upper edge of one side wall to the upper edge of the other side wall, said selvage strip being provided with openings therein communicating with said longitudinal channel, whereby treated air from said air source may be introduced into the chamber formed by said endless belt conveyor, said side walls, and said cover.

14. The improvement according to claim 13 wherein said upper support pan has fabricated in a plurality of sections, and means for providing communication from one section to the next to permit the passage of air therebetween.

* * * * *